Sept. 10, 1957   C. S. MERTLER   2,806,106
CONSTANT CALIBRATION THERMOSTAT
Filed May 17, 1955

INVENTOR.
CHARLES S. MERTLER
BY Woodling and Krost,
attys.

2,806,106

CONSTANT CALIBRATION THERMOSTAT

Charles S. Mertler, Mansfield, Ohio, assignor to Stevens Manufacturing Company, Inc., a corporation of Ohio Application May 17, 1955, Serial No. 508,837

17 Claims. (Cl. 200—138)

The invention relates in general to devices having calibrated positions such as thermostatic electrical switches having contact blades wherein contacts are to be placed in a predetermined position in order to be calibrated as to temperature or some other changing ambient condition. The invention relates specifically to the means for assembling and mounting the device so that the calibration of the device is not changed by different amounts of stress in the mounting means.

In prior art thermostatic switches, which may be used as an example of a use of the present invention, the typical construction was to use a stack of flexible elements. The thermostat stack would be mounted on a base by means of a hollow rivet and the stack would contain the contact strips and bimetallic strip as well as insulating washers to insulate the contact strips from each other and the base. The rivet would, of course, be headed on both ends to hold the stack together. In order to perform the final heading operation the thermostat could be placed in a press and the end of the rivet shank pressed over or peened over against the thermostat base.

The insulating washers commonly used in thermostats are either mica or a ceramic material. Either of these contain irregularities in thickness and surface flatness when in production quantities. Also, the mica washers are compressible and the ceramic washers are frangible. Thus, if too great a pressure is placed on a stack containing ceramic washers, they will crack. If the thickness varies from one side to the other in the washers, then one side of the entire stack can be higher than the other side; and when a mounting bolt is placed down through the hollow rivet to fasten the entire thermostat to a support of the electrical device to be controlled, then such mounting bolt may hit only one side of the head of the rivet and thus squeeze the high side of the rivet stack. This can easily change the calibration and it has been found that the calibration may change as much as twenty-five degrees merely by placing this off-center compressive force on the stack by the mounting bolt.

Also, the support of the electrical device to which the thermostat is mounted and electrically connected may not be exactly normal to the mounting hole which frequently is a tapped hole. Thus, when the mounting bolt or screw is passed through the hollow rivet and tightened down against this non-perpendicular support, again one side of the stack may be squeezed more than the other side. This will also change the calibration. Any other imperfections and irregularities in the entire stack and mounting arrangement of the thermostat will also provide variations in calibration when the thermostat is mounted.

An object of the invention therefore is to provide a thermostat which does not appreciably change calibration upon being mounted on the supporting device.

Another object of the invention is to provide a condition responsive device which has a stack of members and which stack is compressed upon being assembled and which stack may be further compressed upon being mounted, yet wherein the first and second compressive stresses are applied in a different manner so that the device may be calibrated after it is assembled, namely, after the first compressive stress is established, and which then may be mounted to a device to establish a second compressive stress yet which latter mentioned stress does not affect the calibration previously determined.

Still another object of the invention is to provide a mounting means for an electrical device having contact members wherein the stress established in the device by the mounting means is essentially along the axis of the assembling means despite any irregularities in the parts of the device so that this stress is equally divided on two opposite sides of this axis, and therefore the calibrated position of parts of the device is not changed by such mounting stress.

Another object of the invention is to provide an assembling and mounting device for a thermostatic switch which provides a stable mounting for the device, yet with the stress caused by the mounting lying on areas of contact equally divided on either side of a line perpendicular to the longitudinal axis of the device and to the axis of the assembling means, and therefore the calibration of the device remains unchanged by the mounting stress.

Another object of the invention is to provide a thermostatic switch having a stack of members with a mounting means so that the force of the mounting means is transmitted as a compressive stress to the stack with this compressive stress being only along a transverse line on one end of the stack.

Other objects and a fuller understanding of this invention may be had by referring to the following description and claims, taken in conjunction with the accompanying drawing, in which:

Figure 1:
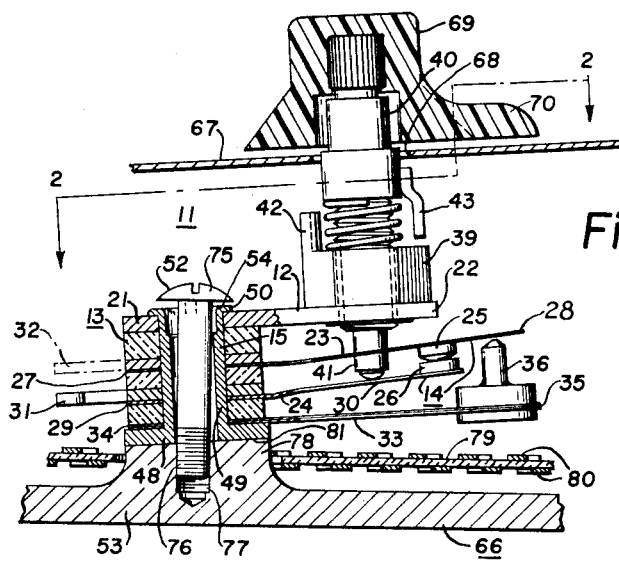
Figure 1 is a side view partially in section of a thermostatic device incorporating the invention.

The Figures 1–4 show a thermostat 11 which is illustrative of any number of different forms of thermostats, this being a simple creep action thermostat; yet the invention could be readily applied to snap action thermostats or other well-known constructions. The Figures 1–4 also show that the thermostat 11 is a form of condition responsive device responsive to an ambient condition, which condition in this case is temperature.

The thermostat 11 may be of any desired construction and as shown includes a heavy gauge base 12, a stack 13, operating members 14, and a first stress member 15 assembling or holding the stack together. The base 12 has a mounting end 21 and a cantilever end 22. The operating members 14 are in the case of the thermostat 11 shown as a first contact strip 23 and a second contact strip 24 carrying electrical contacts 25 and 26, respectively. The strip 23 has a mounting end 27 and an operating end 28 which carries the contact 25, and the strip 24 has a mounting end 29 and an operating end 30 which carries the contact 26. Each of the mounting ends 27 and 29 has an aperture disposed within the stack 13 so that the stress member 15 may pass through these apertures. The operating end 30 is biased upwardly and the operating end 28 is biased downwardly as mounted in the stack 13 for mutual engagement of the contacts 25 and 26. Terminal lugs 31 and 32 are in the stack 13 and in electrical contact with the contact strips 24 and 23, respectively. A bimetallic strip 33 also has a mounting end 34 in the stack 13 and a movable end 35 which carries an insulator stud 36 which may bear against and move upwardly the operating end 28. The stack 13 carried a plurality of insulator washers 37, in this case shown as three in number, which insulate each of the contact strips 23 and 24 from each other and from the base 12. These washers also insulate the bimetallic strip 33 from the other elements in the stack.

The cantilever end 22 of the base 12 fixedly carries a nut 39 into which an adjusting screw 40 is threadably adjustable and which extends through an aperture in the base 12 and another aperture in the contact strip 23 to have an insulator tip 41 adjustably bear against and move the contact strip 24. A nut 39 has an extension 42 and the shaft of the screw 40 has an abutment 43 welded thereto which, as best shown in Figure 2, may engage either shoulder 44 or 45 of the extension 42 to act as a rotational limit stop for the adjusting screw 40.

Figure 2:
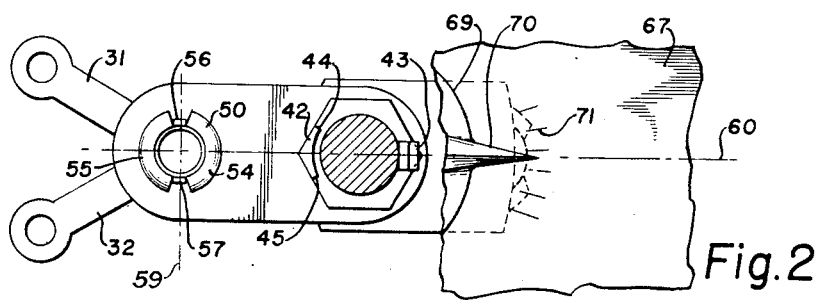
Figure 2 is a sectional view on the line 2—2 of Figure 1.
Figure 3:
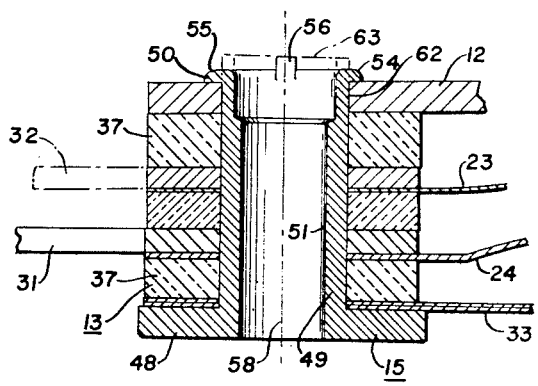
Figure 3 is an enlarged sectional view of the stack of the thermostat.

The stack 13 is held together by the first stress member 15 which in the case of Figures 1-4 is shown as a rivet having an enlarged head 48, a shank 49, and a pressed-over head 50. The shank 49 is hollow as defined by an aperture 51 to provide space for a mounting bolt or second stress member 52 which may be used as shown in Figures 1-4 to fasten the entire thermostat 11 to a support 53. As best shown in Figures 2 and 3, the pressed-over head 50 has first and second diametrically opposed portions 54 and 55, respectively, and third and fourth diametrically opposed portions 56 and 57, respectively. The portions 56 and 57 are small in the order of thirty degrees of arc, with the portions 54 and 55 being the remainder of about one hundred fifty degrees of arc. Only the portions 54 and 55 are pressed over against the top surface of the base 12, whereas the portions 56 and 57 remain as longitudinal projections parallel to the axis 58 of the rivet 15, and the projections 56 and 57 lie on a transverse axis 59 which is perpendicular to the longitudinal axis 60 of the entire thermostat and perpendicular to the axis 58 of the rivet 15. Therefore, all these axes 58, 59, and 60 are mutually perpendicular. The rivet shank 49 has a reduced wall thickness portion 62 at the small head end thereof which makes it easier to press over the head 50. As shown by the dotted line 63, the rivet shank in an initial stage of assembly extends a given distance beyond the base 12 and then is pressed over at the portions 54 and 55 to form the pressed-over head 50. The pressing die may be so formed with slots therein so that the portions 56 and 57 remain axially projecting and are not pressed over by the action of the pressing die.

The Figure 1 shows the entire thermostat 11 mounted in an electrical device 66 of which the support 53 is a part. This electrical device may be any suitable device which the thermostat may control in temperature and has been illustrated as a flatiron with the support 53 therefor being the sole plate of the iron. The device 66 also would have a cover 67 having an aperture 68 through which the adjusting screw 40 may extend and on which an adjusting control knob 69 may be placed. The control knob 69 may have a pointer 70 to cooperate with indicia 71 on the cover 67. The mounting bolt 52 has a head 75 and a threaded portion 76 which may extend into a tapped hole 77 in a boss 78 to mount the entire thermostat 11 to the device 66. The electrical device 66 may also have an insulator 79 carrying a heater element 80 electrically connected in circuit with the contacts 25 and 26.

Operation

The insulating washers 37 may be either of mica or porcelain or other suitable heat resistant electrical insulation. This porcelain or ceramic material fulfills the requirements as to both being heat resistant and a good electrical insulator, yet it has the defect that it is somewhat frangible and cannot be compressed too tightly else it will crack. This frangibility is somewhat increased by the fact that the surface of the ceramic washers in production cannot be made perfectly smooth. Commercially available porcelain washers have a tolerance of .005 of an inch in thickness and this tolerance can be not only from one washer to the next but unevenness in the surface of a given washer. This unevenness of surface can cause the stack to be thicker at one place than at another. For example, the Figure 3 has been shown with the stack thicker on the right than at the left as viewed in this drawing, and this could be because the insulating washers 37 happen to be assembled in such a way that the thick sides of the washers were on the right. When the various elements of the thermostat 11 are assembled in the stack 13, the rivet 15 initially will have a straight shank as shown by the dotted line 63. Then when the portions 54 and 55 are pressed over by some form of pressing operation, this forms the pressed-over head 50. With the stack being thicker on one side as shown, the axial dimension of the stack over the pressed-over portion 54 will be greater than the axial dimension over the portion 55. The diametrically opposite portions 56 and 57 project axially beyond both portions 54 and 55, however, so that this difference in axial length of the portions 54 and 55 is no longer detrimental.

Figure 4:
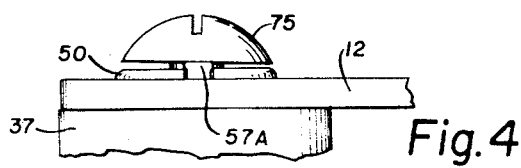
Figure 4 is an enlarged partial view of the stack with the mounting bolt fastened thereon.

The Figures 1 and 4 show the mounting bolt 52 in place, and is best shown in Figure 4 when the head 75 of the mounting bolt is tightened down. This bears against the longitudinally extending portions 56 and 57 causing the portion 57 to be flattened as shown at 57A in Figure 4. It may be twisted slightly due to the twisting action of the head 75, but essentially it compresses along the line parallel to the axis 58 of the rivet 15. By placing both projections 56 and 57 along the axis 59, which is a transverse axis perpendicular to the longitudinal axis 60 of the thermostat 11, and by having these portions 56 and 57 symmetrical with respect to the axis 58 of the rivet, this assures that the second compressive stress on the thermostat 11 as caused by the mounting means or mounting bolt 52 does not change the calibration of the thermostat 11.

A typical prior art construction which did not make use of the projections 56 and 57 was such that a considerable change in calibration of the thermostat could occur when the thermostat 11 was mounted to a support as by the mounting bolt 52. Figure 1 shows the entire thermostat and it will be noted that, if the projections 56 and 57 were not present, then the underside of the head 75 would engage the portion 54 and this would squeeze the right side of the stack and would not squeeze the left side of the stack. This squeezing would tend to raise the bimetallic strip 33 which would tend to raise the contact 25 and thus decrease the temperature at which the contacts were calibrated to open. Also, this squeezing on the right side of the stack would lower the base 12 which, acting through the adjusting screw 40, would lower the contact 26 and this also would decrease the temperature at which the contacts were calibrated to open. The Figures 1 and 2 show that the thermostat 11 has two rotational limit positions of the adjusting screw 40. These are when the abutment 43 strikes either shoulder 44 or shoulder 45. The thermostat 11 is calibrated during manufacture to open the contacts 25 and 26 at a predetermined temperature for each of these two rotational limit positions and thus the thermostat has a calibrated temperature range. Thus, when the thermostat 11 is mounted in an electrical device 66, the manufacturer of the device need only attach the control knob 69 at a predetermined position and the device will be correctly calibrated as shown by the pointer 70 and indicia 71. The thermostats can be calibrated during manufacture to open the contacts at a predetermined temperature plus or minus only one or two degrees. However, it has been found that in the prior art form of thermostats, when the entire thermostat 11 was mounted in the electrical device and the projecting portions 56 and 57 were not provided, the irregularities in the stack 13 and in the entire mounting assembly caused calibration changes as much as twenty-five degrees. This change of calibration is believed to be primarily because of the tolerance in thicknesses in the ceramic insulating washers 37. However, many other factors enter into this large change in calibration. The Figure 1 illustrates another cause wherein it shows that the boss 78 in the sole plate 53 of the flatiron has an upper surface 81 which is not horizontal. Specifically, it is not perpendicular to the tapped hole 77. This could be a cast aluminum sole plate and either the upper surface 81 may not be machined parallel to the bottom surface of the sole plate 53 or perhaps the tapped hole 77 may not be drilled and tapped perpendicular to either the upper surface 81 or the lower surface of the sole plate 53. As shown in Figure 1, this upper surface 81 may slope upwardly to the right; then when the mounting bolt 52 is inserted through the aperture 51 of the rivet 15, the mounting bolt is not exactly coincident with the axis 58 of the rivet and this again, if it were the prior art form of construction, could cause a squeezing of one side of the thermostat stack more than the opposite side.

Still another irregularity is that practically all bolts or screws today are not machined but rather are made by a cold heading process and have the threads rolled therein rather than cut. Generally a split die holds the shank during the cold heading process and this leaves a ridge or flash on the underside of the head 75. If this ridge or flash were not parallel in the prior art thermostat with the axis 49, then this ridge also could cause more compressive stress on one side of the stack than on the opposite side. These many things all contribute to the fact that the prior art thermostats could change in calibration as much as twenty-five degrees when they were mounted in the electrical device 66, and in today's high production assembly lines it does little good to caution the production line assemblers not to tighten the screws 52 too tightly.

During assembly of the stack 13 a press may be used to form the pressed-over portions 54 and 55. This pressing action places a compressive stress on the stack 13. When the pressure of the press is relieved, the stack will expand longitudinally against the head 50 and this places a slight tensile stress in the rivet shank 49 which counterbalances the first compressive stress remaining in the stack 13 so that these forces are in equilibrium and the heads of the rivet are tight against opposite ends of the stack. Then when the entire thermostat is mounted in the electrical device 66 with the mounting bolt 52 tightened in place to establish a second compressive stress, the portions 56 and 57 are compressed and partially flattened to transfer the second compressive stress practically entirely directly on the shank 49 of the rivet 15 and only a minor portion of this stress will be transferred to the stack 13. This has two advantages because the compressive stress caused by the mounting means first must relieve some of the tensile stress formerly in the shank 49 before it can actually cause a compressive stress in the shank 49, and secondly a minimum of additional compressive stress is transferred to the stack 13 so that the ceramic washers 37 which are frangible will not be crushed or fractured. Also, the large bearing area of the head 48 of the rivet 15, when combined with the mounting bolt points of contact at the portions 56 and 57, provides a stable mounting for the entire thermostat. Also, this enlarged head 48 and two points of contact 56 and 57 establish a reference cone having as its base the enlarged head 48 and with this cone being truncated and flattened at the top to have a wedge-shaped top defined by the points 56 and 57 on the axis 59. This reference cone provides the aforesaid stable mounting and assures that the compressive stress applied to the portions 56 and 57 will not change the calibration of the thermostat even though one side of the stack may be thicker than the other, or as shown in Figure 1 the mounting surface 81 may not be perpendicular to the tapped hole 77.

Another way of looking at the improved mounting means is that the areas or points of contact established by the points 56 and 57 assure that the compressive stress established by the mounting bolt 52 will be at least at the upper end of the stack equally divided on each side of the transverse axis 59. One may consider a reference plane established by the intersecting rivet axis 58 and transverse axis 59. The compressive stress is likewise divided equally on each side of this plane at least at this upper end of the stack. This equal division of compressive stress on a line perpendicular to the longitudinal axis 60 assures that the portions 56 and 57 may be flattened almost completely and still the calibration change in the thermostat will not be more than two or three degrees. This is a tremendous improvement over the prior art and proves the feasibility of utilizing mounting points of contact lying substantially only on the line perpendicular to the longitudinal axis.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An improved mounting to a support for a condition responsive switch having a plurality of elongated contact strips carried at one end in a stack mounted on a base by a stress member, said stress member having a shank passing through said stack with first and second heads near the ends thereof to hold said stack to said base, said device having a longitudinal axis substantially parallel to the length dimension of said elongated strips and having a stress member axis and a reference plane containing said stress member axis each substantially perpendicular to said longitudinal axis, said improved mounting comprising, first and second diametrically opposed portions of said first head extending longitudinally of said stress member and lying substantially in said reference plane on a line substantially perpendicular to said stress member axis, whereby a mounting element may be tightened into engagement with said first and second portions as the said second head is pressed against the support and whereby the tightening of the mounting element establishes a compressive stress which is borne at said first head of the stress member substantially equally on each side of said reference plane to substantially preclude any change in calibration in said condition responsive switch by reason of said compressive stress.

2. An improved mounting for a thermostatic device having a plurality of elongated flexible members carried in calibrated positions at one end in a stack mounted on a base by a hollow rivet, said rivet having a shank passing through said stack with first and second heads near the ends thereof to hold said stack to said base, said thermostatic device having a longitudinal axis substantially parallel to the length dimension of said elongated members and having a rivet axis and a reference plane containing said rivet axis each substantially perpendicular to said longitudinal axis, said improved mounting comprising, first and second diametrically opposed portions of said first rivet head pressed over said base to form the means holding said stack to said base, third and fourth diametrically opposed portions of said first rivet head extending generally longitudinally parallel to said rivet axis and lying substantially in said reference plane on a line substantially perpendicular to said rivet axis, whereby a headed mounting bolt may be passed through said hollow rivet to fasten said device to a support with the head of the bolt tightened into engagement with said third and fourth portions as the second head of the rivet is pressed against the support by the tightening of the bolt, and whereby the tightening of the mounting bolt establishes a compressive stress substantially all of which is borne by the shank of said rivet and which by means of said third and fourth portions is applied at said first rivet head substantially equally on each side of said reference plane to substantially preclude any change in the calibrated positions of said members in said device by reason of said compressive stress.

3. An improved mounting for a thermostatic electric switch having a plurality of elongated flexible contact strips carried at one end and insulated by frangible washers in a stack mounted on a base by a hollow rivet, said rivet having a shank passing through said stack with first and second heads near the ends thereof to establish a first compressive stress in said stack by a tensile stress in said shank, said first compressive stress being insufficient to fracture said frangible washers, said thermostatic switch having a longitudinal axis substantially parallel to the length dimension of said elongated strips and having a rivet axis and a reference plane containing said rivet axis each substantially perpendicular to said longitudinal axis, said improved mounting comprising, a thin portion at one end of said shank, first and second diametrically opposed portions of said first rivet head in said thin wall portion pressed over said base to apply said first compressive stress to said stack, third and fourth diametrically opposed portions of said first rivet head extending generally longitudinally parallel to said rivet axis and lying substantially in said reference plane on a line substantially perpendicular to said rivet axis, whereby a headed mounting bolt may be passed through said hollow rivet to fasten said switch to a support with the head of the bolt tightened into engagement with said third and fourth portions as the second head of the rivet is pressed against the support by the tightening of the bolt, and whereby the tightening of the mounting bolt establishes a second compressive stress insufficient to fracture said frangible washers and substantially all of which is borne by the shank of said rivet and which by means of said third and fourth portions is applied at said first rivet head substantially equally on each side of said reference plane to substantially preclude any change in temperature calibration in said thermostatic switch by reason of said second compressive stress.

4. A thermostat, comprising, a base, first and second members each having a mounting portion and an operating portion, a temperature responsive member having a mounting portion and a movable portion movable upon temperature changes, at least two of said members generally extending along a longitudinal axis of said thermostat, insulating washers insulating said first and second members from said base, a stack comprising at least one of said washers and the mounting portions of at least one of said first and second members and said temperature responsive member, all said members in said stack having an aperture therethrough, said base being on one end of said stack, a rivet having a shank extending through said apertures in said stack and having first and second heads on the two ends thereof holding said stack together and to said base, said operating portions being mutually cooperable, adjustable means in said device disposed to provide relative movement between said operating portions, said temperature responsive member movable portion being disposed to provide relative movement between said operating portions, one of said rivet heads having a relatively large bearing surface on a given area of the adjacent end of said stack, said stack having a reference line substantially perpendicular to said longitudinal axis and substantially perpendicular to the axis of said rivet, and compressive means adapted to place a compressive stress on said stack with said stress being borne at least at one end of said stack by areas of contact substantially equal on both sides of said reference lines despite irregularities in said stack.

5. A thermostat, comprising, a base, first and second members each having a mounting portion and an operation portion, a temperature responsive member having a mounting portion and a movable portion movable upon temperature changes, at least two of said members generally extending along a longitudinal axis of said thermostat, insulating washers insulating said first and second members from said base, a stack comprising at least one of said washers and the mounting portions of at least one of said first and second members and said temperature responsive member, all said members in said stack having an aperture therethrough, said base being on one end of said stack, a rivet having a shank extending through said apertures in said stack and having first and second heads on the two ends thereof holding said stack together and to said base, said operating portions being mutually cooperable, adjustable means in said device disposed to provide relative movement between said operating portions, said temperature responsive member movable portion being disposed to provide relative movement between said operating portions, one of said rivet heads having a relatively large bearing surface on a given area of the adjacent end of said stack, and compressive means adapted to place a compressive stress on said stack with said stress being borne at one end of said stack by said large bearing surface area and at the other end of said stack by points of contact lying substantially only on a line substantially perpendicular to said longitudinal axis.

6. A device, comprising, a base, first and second members each having a mounting portion for mounting to said base and each having an operating portion, a condition responsive member having a mounting portion and a movable portion movable upon changes of an ambient condition, at least two of said members generally extending along a longitudinal axis of said device, said operating portions being mutually cooperable, a stack comprising said base and the mounting portions of at least one of said first and second members and said condition responsive member, all said members in said stack having an aperture therethrough, said condition responsive member movable portion being disposed to provide relative movement between said operating portions, and compressive means including a stress member having a shank extending through said apertures and adapted to place a compressive stress on said stack with said stress being borne at one end of said stack by only two points of contact lying substantially only on a line substantially perpendicular to said longitudinal axis and substantially perpendicular to the axis of said aperture.

7. A device, comprising, a base, first and second members each having a mounting portion for mounting to said base and each having an operating portion, a condition responsive member having a mounting portion and a movable portion movable upon changes of an ambient condition, at least two of said members generally extending along a longitudinal axis of said device, said operating portions being mutually cooperable, a stack comprising said base and the mounting portions of at least one of said first and second members and said condition responsive member, all said members in said stack having an aperture therethrough, adjustable means in said device disposed to provide relative movement between said operating portions, said condition responsive member movable portion being disposed to provide relative movement between said operating portions, and compressive means including a stress member having a shank extending through said apertures and adapted to place a compressive stress on said stack with said stress being borne at one end of said stack by a large bearing surface and at the other end of said stack only by points of contact lying substantially only on a line substantially perpendicular to said longitudinal axis and substantially perpendicular to the axis of said aperture.

8. An electrical device, comprising, a base, first and second members each having a mounting portion and an operation portion, a temperature responsive member having a mounting portion and a movable portion movable upon temperature changes, said members generally extending along a longitudinal axis of said device, insulating washers, a stack comprising said washers disposed between said member mounting portions and said base for mutual insulation, said base being on one end of said stack and said temperature responsive member being on the other end of said stack, a rivet in said stack having a shank with first and second heads on the two ends thereof holding said stack together and in engagement with said base and temperature responsive member, respectively, said operating portions being mutually cooperable, adjustable means in said device disposed to provide relative movement between said operating portions, said temperature responsive member movable portion being disposed to provide relative movement between said operating portions, one of said rivet heads having a large bearing surface on the adjacent end of said stack, and mounting means for mounting said device to a support and adapted to place a given compressive stress on said thermostat with a majority of said stress being a compressive stress on said rivet shank and the remainder being a compressive stress on said stack which on one end thereof is substantially equally divided on either side of a reference line substantially mutually perpendicular to said longitudinal axis and the axis of said rivet, despite said given compressive stress being along a line non-coincident with said rivet axis, and said reference line and said large bearing surface establishing a reference cone which is truncated and has a wedge-shaped top to thus offer a stable mounting for said device yet one which does not substantially change the temperature calibration of the device with different amounts of said given compressive stress.

9. An electrical device, comprising, a base, first and second members each having a mounting portion and an operating portion, a temperature responsive member having a mounting portion and a movable portion movable upon temperature changes, said members generally extending along a longitudinal axis of said device, frangible insulating washers, a stack comprising said washers disposed between said member mounting portions and said base for mutual insulation, said base being on one end of said stack and said temperature responsive member being on the other end of said stack, all said members in said stack having an aperture therethrough with an axis generally perpendicular to said longitudinal axis, a rivet having a shank extending through said apertures in said stack and having first and second heads on the two ends thereof holding said stack together and in engagemnet with said base and temperature responsive member, respectively, said operating portions being mutually cooperable, adjustable means in said device disposed to provide relative movement between said operating portions, said temperature responsive member movable portion being disposed to provide relative movement between said operating portions, one of said rivet heads having a large bearing surface on the adjacent end of said stack, and mounting means for mounting said device to a support and adapted to place a compressive stress on said thermostat with substantially all of said stress being a compressive stress on said rivet shank and the remainder being a compressive stress on said stack borne at one end of said stack by said large bearing surface and at the other end of said stack by points of contact lying substantially only on a line substantially perpendicular to said longitudinal axis and intersecting and substantially perpendicular to said aperture axis, said contact point line and said large bearing surface establishing a reference cone which is truncated and has a wedge-shaped top to thus offer a stable mounting for said device yet one which does not substantially change the temperature calibration of the device with different amounts of compressive stress, said mounting means including a surface defining an axial aperture through said rivet and including projections establishing said contact point line on one of the inner and outer surfaces of one of said rivet heads at opposite sides of said aperture.

10. A condition responsive device, comprising, a base having first and second ends, an operating strip having first and second ends, a stress member having a head and a shank, a stack including said stress member fastening together the first ends of said strip and base, an operating portion mounted on said strip and a second operating portion carried by said device for mutual cooperation, a condition responsive element carried in said stack and disposed to provide relative movement between said operating portions, said stress member shank being longer than the axial length of said stack so that the end thereof extends beyond said base, said shank end having at least a portion thereof pressed over against said base to hold together said stack, said shank end also having first and second diametrically opposed portions disposed on a line substantially perpendicular to the longitudinal axis of said condition responsive element extending axially beyond said pressed over portion, whereby said device may be fastened to a mounting surface by mounting means bearing against substantially only said first and second diametrically opposed portions.

11. A thermostat for use in an electrical power consuming and heat producing apparatus having a heatable mounting surface with a mounting hole therein generally normal thereto, said thermostat comprising a relatively rigid base having first and second ends, a contact strip having first and second ends, insulator spacers, a hollow rivet having a head and a hollow shank, a stack including said hollow rivet fastening together the first ends of said strip and base with said insulator spacers insulating said strip and base, a first contact mounted on said contact strip and a second contact carried by said thermostat for mutual engagement of said contacts, a bimetallic strip carried in said stack and disposed to provide relative movement between said contacts with temperature changes, an adjustable screw threadably carried by said base to adjustably and relatively move said contacts, stop means coacting between said screw and said base to provide first and second rotational limit positions, said thermostat having a calibrated temperature range as determined by the temperatures at said first and second limit positions, said rivet shank being longer than the axial length of said stack so that the end thereof extends beyond said base, said shank end having at least a portion thereof pressed over against said base to hold together said stack, said shank end also having first and second diametrically opposed portions disposed on a line substantially perpendicular to the longitudinal axis of said bimetallic strip and each being about thirty degrees of arc and extending axially about one-sixteenth of an inch beyond said pressed over portion, whereby said thermostat may be fastened to said mounting surface by a headed screw extending through said hollow rivet into said mounting hole with the head of said screw tightened against said first and second diametrically opposed portions, and whereby said first and second diametrically opposed portions may be flattened substantially completely by the force of said screw substantially without change of said calibrated temperature range.

12. A thermostat for use in an electrical power consuming and heat exchange apparatus having a mounting surface with a tapped hole therein generally normal thereto, said thermostat comprising, a relatively rigid base having first and second ends, first and second contact strips each having contacts adapted for mutual engagement, a hollow rivet having a head and a hollow shank, a stack including said hollow rivet fastening together said strips and said base, temperature responsive means carried in said stack and disposed to provide relative movement between said contacts, adjustable means carried by said thermostat and disposed to provide relative movement between said contacts and in at least one position thereof providing a calibrated operating temperature, a counterbore in said shank end to establish a thin wall section thereof, said rivet shank beoing longer than the axial length of said stack so that said thin wall section thereof extends beyond said base, said shank end having first and second and third and fourth diametrically opposed portions, said third and fourth diametrically opposed portions each being about one hundred fifty degrees of arc and being pressed over against said base to hold together said stack, said first and second diametrically opposed portions being disposed on a line substantially perpendicular to the longitudinal axis of said contact strips and each being about thirty degrees of arc and extending axially about one-sixteenth of an inch beyond said third and fourth opposed portions, whereby said thermostat may be fastened to said mounting surface by a headed screw extending through said hollow rivet into said tapped hole with the head of said screw tightened against said first and second diametrically opposed portions, and whereby said first and second diametrically opposed portions may be flattened substantially completely by the force of said screw substantially without change of said calibrated operating temperature.

13. A thermostat for use in an electrical power consuming and heat producing apparatus having a heatable mounting surface with a tapped hole therein generally normal thereto, said thermostat comprising, a heavy gauge relatively rigid metal base having first and second ends, first, second, and third flexible strips each having first and second ends, insulator spacers, a hollow rivet having a head and a hollow shank, a stack including said hollow rivet fastening together the first ends of said strips and base with said insulator spacers mutually insulating said strips and base, said base and said strips being disposed in said stack in the order named, electrical terminals in said stack in electrical connection to said first and second strips and adapted to be connected to said electrical apparatus for control of the power thereto and consequently the temperature thereof, first and second contacts mounted on adjacent sides of the second ends of said first and second strips, respectively, to be mutually engageable, said third strip being bimetallic and carrying an insulator button and movable toward said first strip upon rising temperatures to move said first contact in a first direction out of engagement with said second contact, an aperture near the middle of said first strip, an adjustable screw threadably carried by the second end of said base and carrying an insulated tip extending through said aperture to adjustably move said second strip in the opposite direction, stop means coacting between said screw and said base to provide first and second rotational limit positions, said thermostat having a calibrated temperature range as determined by the temperatures at said first and second limit positions, the underside of said rivet head engaging said third strip, a counterbore in said shank end to establish a thin wall section thereof, said rivet shank being longer than the axial length of said stack so that said thin wall section thereof extends beyond said base, said shank end having first and second and third and fourth diametrically opposed portions, said third and fourth diametrically opposed portions each being about one hundred fifty degrees of arc and being pressed over against said base to hold together said stack, said first and second diametrically opposed portions being disposed on a line substantially perpendicular to the longitudinal axis of said base and each being about thirty degrees of arc and extending axially about one-sixteenth of an inch beyond said third and fourth opposed portions, whereby said thermostat may be fastened to said mounting surface by a headed screw extending through said hollow rivet into said tapped hole with the head of said screw tightened against said first and second diametrically opposed portions, and whereby said first and second diametrically opposed portions may be flattened substantially completely by the force of said screw substantially without change of said calibrated temperature range.

14. In a stacked thermostat having contact members and a temperature responsive member, said thermostat having a longitudinal axis from said stack to said contact members, an improved mount comprising, a surface in said stack defining an aperture therethrough, and compressive means including a stress member having a shank extending through said aperture and adapted to place a compressive stress on said stack with said stress being borne at one end of said stack by only two areas of contact lying substantially only on a line substantially perpendicular to said longitudinal axis and substantially perpendicular to the axis of said aperture.

15. In a stacked thermostat having contact members and a temperature responsive member, said thermostat having a longitudinal axis from said stack to said contact members, an improved mount comprising, a surface in said stack defining an aperture therethrough, two raised areas on one end of said stack, and compressive means including a stress member having a shank extending through said aperture and adapted to place a compressive stress on said stack with said stress being borne at said one end of said stack by said two raised areas lying substantially only on a line substantially perpendicular to said longitudinal axis and substantially perpendicular to the axis of said aperture.

16. A condition responsive device, comprising, first and second members each having a mounting portion and an operating portion, said operating portions being mutually cooperable, a stack comprising the mounting portions of said first and second members, a longitudinal axis of said device extending from said stack to said operating portions, said stack having an aperture therethrough, and compressive means including a stress member having a shank extending through said aperture and adapted to place a compressive stress on said stack with said stress being borne at one end of said stack by only two areas of contact lying substantially only on a line substantially perpendicular to said longitudinal axis and susbtantially perpendicular to the axis of said aperture.

17. A device, comprising, first and second members each having a mounting portion and an operating portion, a condition responsive member having a mounting portion and a movabe portion movable upon changes of an ambient condition, at least one of said members generally extending along a longitudinal axis of said device, said operating portions being mutually cooperable, a stack comprising said mounting portions of at least two of said members, all said members in said stack having an aperture therethrough, said condition responsive member movable portion being disposed to provide relative movement between said operating portions, and compressive means including a stress member having a shank extending through said apertures and adapted to place a compressive stress on said stack with said stress being borne at one end of said stack by only two areas of contact lying substantially only on a line susbtantially perpendicular to said longitudinal axis and substantially perpendicular to the axis of said aperture.

References Cited in the file of this patent
UNITED STATES PATENTS

| | | |
|---|---|---|
| 2,317,033 | Dafforn | Apr. 20, 1943 |
| 2,718,572 | Harris | Sept. 20, 1955 |